Oct. 9, 1962 A. M. LIPSKI 3,057,009
MELT SPINNING EXTRUSION HEAD
Filed July 12, 1961 2 Sheets-Sheet 1

INVENTOR.
ANTHONY MATTHEW LIPSKI
BY
ATTORNEY

Oct. 9, 1962　　　A. M. LIPSKI　　　3,057,009
MELT SPINNING EXTRUSION HEAD
Filed July 12, 1961　　　2 Sheets-Sheet 2

INVENTOR.
ANTHONY MATTHEW LIPSKI
BY
ATTORNEY

United States Patent Office 3,057,009
Patented Oct. 9, 1962

3,057,009
MELT SPINNING EXTRUSION HEAD
Anthony Matthew Lipski, Easthampton, Mass., assignor to United Elastic Corporation, Easthampton, Mass., a corporation of Massachusetts
Filed July 12, 1961, Ser. No. 123,590
3 Claims. (Cl. 18—8)

This invention relates to an improved head for the extrusion of filaments from melted plastics such as polyurethanes.

Plastic threads when melt extruded, for example melt extruded polyurethanes, present problems. Ordinarily a large number of filaments are extruded at the same time onto a belt which supports them and provides for cooling, support, stretching and the like. It is with the head itself that the present invention deals. Melt extrusions have been attempted with ordinary spinnerettes such as are used in the rayon, cellulose acetate, and other arts. They have not proven to be satisfactory. Several problems are presented. First, it is extremely difficult to obtain uniformity. Second, air bubbles and similar discontinuities must be avoided, and third, the freshly extruded filaments must be protected from coalescing or sticking around the extrusion orifices.

The present invention solves all of these problems in a simple and reliable apparatus.

Figure 1:
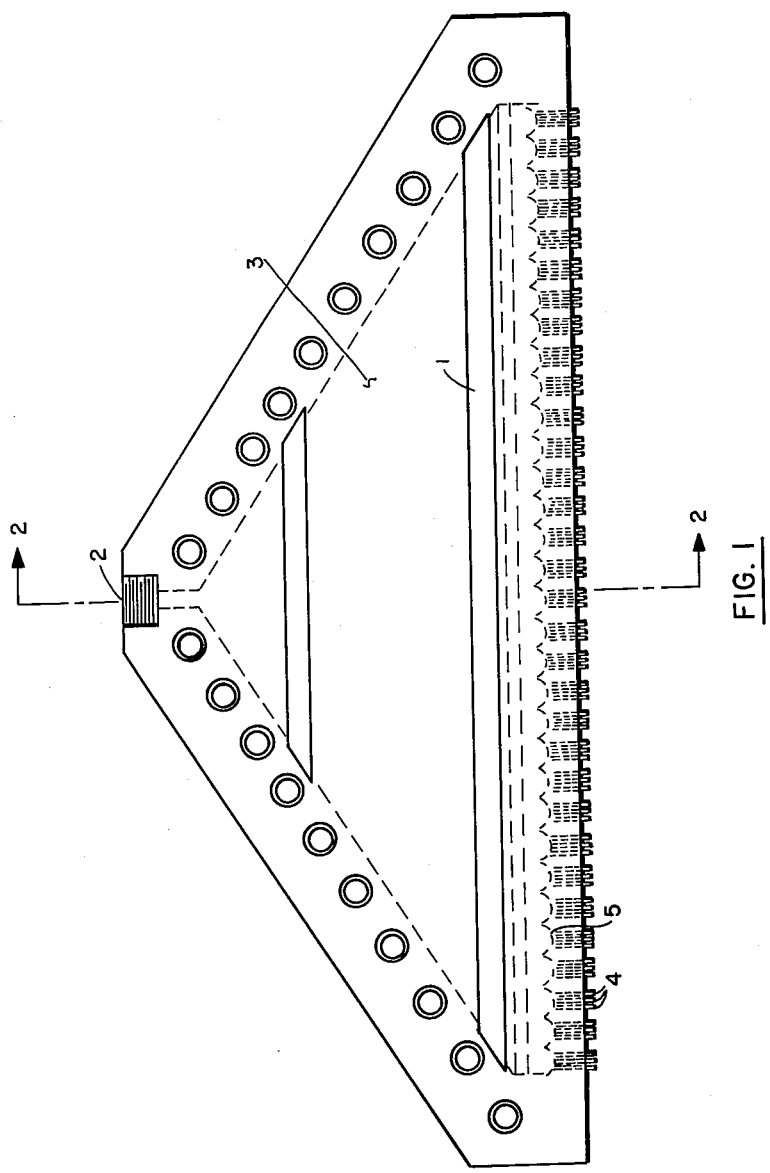
Figure 2:
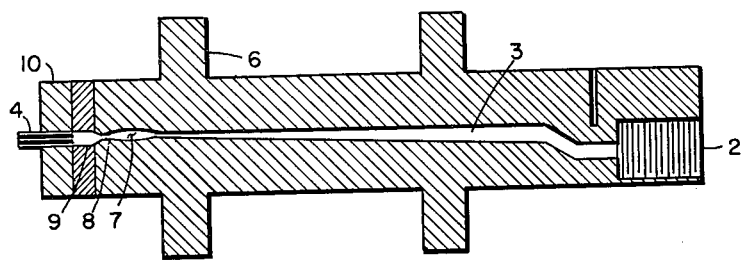
Figure 3:
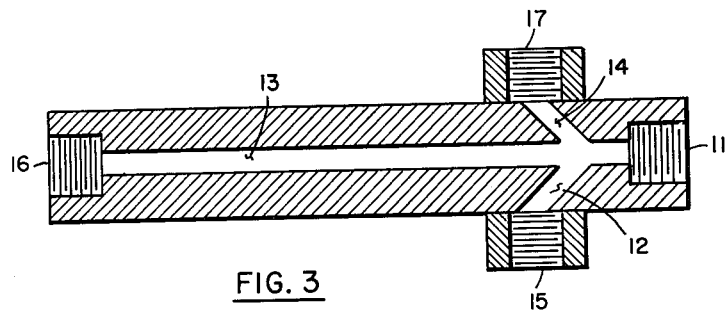
Figure 4:
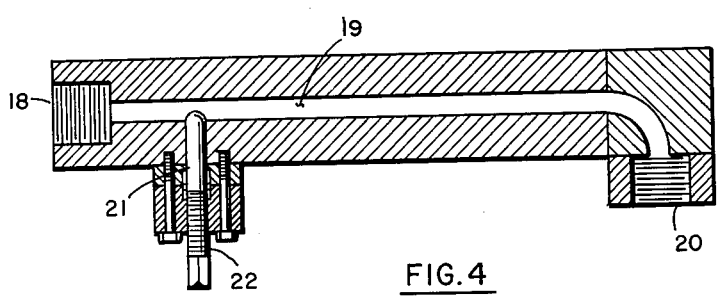

Invention will be described in more detail and the advantageous operation thereof in connection with the drawings in which:

FIG. 1 is a section through a head;
FIG. 2 is a section along the line 2—2 of FIG. 1;
FIG. 3 is a section through a manifold for operating three heads from one source, and
FIG. 4 is a section through one throttling or flow adjusting means.

FIG. 1 illustrates a head for simultaneous extrusion of 40 three filament threads. Molten plastic enters into a framework through a threaded opening 2 which opens into a flat wedge-shaped chamber 3. At the apex of the chamber there are provided surge and equalizing zones which will be described in conjunction with FIG. 2, and the plastic is finally distributed to sets of three hollow extrusion needles 4 by means of scalloped directing vanes 5.

It will be seen in FIG. 2 that the chamber 3 is a narrow wedge between two ribbed plates 6 carried by the framework 1. The plates are provided with suitable heaters (not shown), to maintain a suitable temperature or temperature gradient in the chamber. At the apex of the chamber there is provided an enlargement 7 from which a constriction 8 leads into a second enlargement 9 into which the hollow extrusion needles 4 are mounted. The needles extend beyond a plate 10 for reasons which will be described below.

The molten plastic in the chamber 3 passes into the enlargement 7 where pressure is equalized. Then the constriction 8 passes into the second enlargement 9 where there is a further equalization of pressure. These successive restrictions and enlargements assure that the plastic will be uniform and under a uniform pressure as it is forced through the hollow extruding needles 4. Without the enlarged chambers the pressure may vary and so some needles will extrude more rapidly than others. As the extruded filaments contact a moving belt, as is conventional in all filament spinning machines, non-uniformity of pressure will prevent uniform filaments of uniform lengths.

The use of hollow needles instead of holes in a block as in the ordinary spinnerette practice, produces an important result. When melted plastic is extruded in the form of filaments it hardens by cooling, which is a rather gradual phenomenon, and is quite different from the rapid setting which results from spinning a solution of a fiber-forming material in a solvent that evaporates rapidly or spinning into a coagulating bath. The extruded filament of molten plastic remains tacky for an appreciable time, and it has been found that ordinary spinnerettes are not practically useful. As the filament is extruded it sticks to the plate around the spinnerette orifices and tends to form beads of coalesced plastic. The extruding needles, however, force the filament out completely surrounded by air. There is nothing for it to stick to and so no problem is presented. The filaments flow out steadily and uniformly, and a rapid production of uniformly high quality threads is made possible.

One of the factors is quality melt extruded filaments is that the filaments shall set at more or less uniform rates. This means that the temperature of the extruded plastic must be constant. If there are variations in temperature along an extruding head some filaments will be hotter when they leave the extruding needles and will set more slowly than those adjacent. Also there is an optimum temperature for the extruded threads, and it is important that this is maintained within reasonable limits. In the present invention the very thin wedge-shaped chamber 3 assures that heat from external heaters is transferred rapidly to the plastic moving therethrough which is heated to substantially the same temperature in each zone. This assures constant temperature and the enlargements and constrictions equalize pressure so that a continuous uniform extrusion is made possible. It is also important that all plastic introduced into the head be extruded fairly promptly and time of dwell in the head remains constant at a predetermined figure.

The size of extruding head which is practical is somewhat limited. FIG. 1 shows a commercial sized head which is of practical size for extruding polyurethane plastic. The flow of plastic through the head can be made rapid but the total volume of plastic extruded in filament form per unit time depends on head size. Some plastic melters and pumps have a considerably larger capacity, for example about three times the capacity of a single head. Accordingly, it is sometimes desirable to operate more than one head from a common melting tank and supply line. This is shown in FIGS. 3 and 4. In the former plastic from the supply source, preferably a positive displacement pump, enters through the threaded opening 11 into three diverging conduits 12, 13 and 14. Each of them is provided with threaded outlets 15, 16 and 17 respectively.

FIG. 4 shows a control connection for one head. A threaded input opening 18 may, for example, be connected to the output 17 of FIG. 3. From the inlet a curved conduit 19 leads to a threaded output 20 which connects to the input 2 of one head. A plunger 21 can be moved in and out of the conduit by means of the micrometer screw 22, and can be adjusted to provide just the right degree of throttling so that each extruding head receives plastic under the same pressure. As pressure and temperature conditions are maintained constant in each head, as has been described above, a number of heads can be operated uniformly to produce a very large number of threads.

In the drawings the production of three filament threads has been illustrated. However, the heads of the present invention may be used to produce threads of any size desired. With somewhat larger single extrusion needles monofilament threads may be produced, or threads having more than three filaments may be extruded by the choice of suitable groupings of extrusion needles. Regardless of the number of filaments uniform extrusion is assured and there is no danger of bead formation or sticking together of extruded filaments which have not yet set sufficiently. An even more important advantage is that the flow of plastic through the head is uniform and none of the plastic remains too long in the head, which can result in overpolymerization, commonly referred to as "scorching." The exact dimensions of the restriction and enlargements in the head will vary with different plastics, but, once adjusted, provide a steady uniform flow.

I claim:

1. An extrusion head for the simultaneous extrusion of hot melted plastic into a plurality of threads comprising in combination an inlet for molten plastic, a relatively thin wedge-shaped chamber, a series of hollow extruding needles extending along the edge of the head, connections from the extruding needles to the wedge-shaped chamber comprising at least one enlargement and at least one restriction dimensioned to maintain constant back pressure, and means for directing the flow of plastic therefrom to the groups of extruding needles.

2. An extrusion head according to claim 1 in which the extruding needles are in groups formed of a plurality of hollow needles to extrude multi-filament threads.

3. An extruding head according to claim 1 in which the flow directing means are curved vanes arranged in scallops along the extruding edge of the head.

References Cited in the file of this patent

UNITED STATES PATENTS 2,970,340 McDermott _____ Feb. 7, 1961

FOREIGN PATENTS 434,869 France _____ Dec. 9, 1911
318,464 Great Britain _____ Sept. 5, 1929